(12) United States Patent
Takeuchi et al.

(10) Patent No.: US 7,995,520 B2
(45) Date of Patent: Aug. 9, 2011

(54) WIRELESS COMMUNICATION SYSTEM AND TERMINAL

(75) Inventors: Keisuke Takeuchi, Kunitachi (JP); Toshiyuki Saito, Kokubunji (JP); Rintaro Katayama, Kokubunji (JP); Shiro Mazawa, Fujisawa (JP); Akihiko Yoshida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 992 days.

(21) Appl. No.: 11/892,504

(22) Filed: Aug. 23, 2007

(65) Prior Publication Data

US 2008/0205361 A1 Aug. 28, 2008

(30) Foreign Application Priority Data

Feb. 26, 2007 (JP) ................. 2007-044855

(51) Int. Cl.
*H04B 15/00* (2006.01)
(52) U.S. Cl. .............. 370/328; 455/63.1; 455/114.2; 455/278.1; 455/296
(58) Field of Classification Search .............. 370/232, 370/254, 203, 311, 252, 216, 328; 455/522, 455/504, 63.1, 114.2, 278.1, 296; 375/146
See application file for complete search history.

(56) References Cited

U.S. PATENT DOCUMENTS

| | | | |
|---|---|---|---|
| 7,512,412 B2 * | 3/2009 | Mese et al. ............ | 455/522 |
| 7,680,093 B2 * | 3/2010 | Duan et al. ............. | 370/342 |
| 7,693,031 B2 * | 4/2010 | Yang et al. ............. | 370/203 |
| 2003/0236089 A1 * | 12/2003 | Beyme et al. ........... | 455/423 |
| 2005/0043051 A1 * | 2/2005 | Takano et al. ........... | 455/522 |
| 2006/0045061 A1 * | 3/2006 | Duan et al. ............. | 370/342 |
| 2006/0209721 A1 * | 9/2006 | Mese et al. ............ | 370/254 |
| 2006/0211441 A1 * | 9/2006 | Mese et al. ............ | 455/522 |
| 2006/0215559 A1 * | 9/2006 | Mese et al. ............ | 370/232 |
| 2006/0285503 A1 * | 12/2006 | Mese et al. ............ | 370/254 |
| 2007/0041429 A1 * | 2/2007 | Khandekar ............ | 375/146 |
| 2007/0197254 A1 * | 8/2007 | Borran et al. .......... | 455/522 |
| 2008/0014979 A1 * | 1/2008 | Gorokhov et al. ...... | 455/522 |
| 2008/0032732 A1 * | 2/2008 | Hosein .................. | 455/522 |

(Continued)

OTHER PUBLICATIONS

CDMA line-of-sight data communication system with power control attaining error free condition in presence of inter-sector and inter-cell interference; N Izuka—1998. GLOBECOM 98.*

An analysis on downlink capacity of multi-cell OFDMA systems under randomized inter-cell/sector interference K Fu —Vehicular Technology Conference, 2007.*

(Continued)

*Primary Examiner* — Salman Ahmed
(74) *Attorney, Agent, or Firm* — Stites & Harbison PLLC; Juan Carlos A. Marquez, Esq.

(57) ABSTRACT

The present invention provides a wireless communication system and a terminal. A base station notifies terminals of an intensity of a received interference power. The terminal controls a transmission power for transmitting data to the base station, which is one of base stations and to which data is to be transmitted, by referencing an intensity of interference power (OSI) notified from base stations to which data is not to be transmitted. The terminal calculates a decision value for increasing/decreasing the transmission power, wherein the decision value is variable according to the current transmission power of the terminal and propagation attenuations between the terminal and the base stations to which data is not to be transmitted, and variably controls the amount of transmission power increase/decrease according to the decision value for increasing/decreasing a transmission power.

10 Claims, 15 Drawing Sheets

U.S. PATENT DOCUMENTS

| | | | |
|---|---|---|---|
| 2008/0052588 A1* | 2/2008 | Akash et al. | 714/748 |
| 2008/0095036 A1* | 4/2008 | Gorokhov et al. | 370/203 |
| 2008/0117833 A1* | 5/2008 | Borran et al. | 370/252 |
| 2008/0117849 A1* | 5/2008 | Borran et al. | 370/311 |
| 2008/0123520 A1* | 5/2008 | Ji et al. | 370/216 |
| 2008/0153535 A1* | 6/2008 | Gorokhov et al. | 455/522 |
| 2008/0161033 A1* | 7/2008 | Borran et al. | 455/522 |
| 2008/0165675 A1* | 7/2008 | Yang et al. | 370/210 |
| 2008/0166969 A1* | 7/2008 | Gorokhov et al. | 455/63.1 |
| 2008/0175185 A1* | 7/2008 | Ji et al. | 370/318 |
| 2008/0205361 A1* | 8/2008 | Takeuchi et al. | 370/338 |
| 2009/0082052 A1* | 3/2009 | Bhushan et al. | 455/522 |
| 2009/0147693 A1* | 6/2009 | Teague et al. | 370/252 |
| 2009/0149140 A1* | 6/2009 | Borran et al. | 455/114.2 |
| 2010/0027451 A1* | 2/2010 | Khandekar et al. | 370/311 |
| 2010/0034315 A1* | 2/2010 | Khandekar et al. | 375/297 |
| 2010/0069107 A1* | 3/2010 | Mese et al. | 455/504 |

OTHER PUBLICATIONS

An Inter-Cell Interference Cancellation Method for OFDM Cellular Systems Using a Subcarrier-Based Virtual MIMO Kyu In Lee; Kyung Soo Woo; Yo Han Ko; Jae Young Ahn; Yong Soo Cho; Vehicular Technology Conference, 2006.*

An Analysis on Downlink Capacity of Multi-Cell OFDMA Systems Under Randomized Inter-cell/sector Interference I-Kang Fu; Wern-Ho Sheen; Vehicular Technology Conference, 2007.*

"Section 7.76.4.1.2.1 Simultaneous Assignments—7.7.6.4.1.8 OSI Report message procedures", IEEE, C802.20, Jun. 2004, pp. 468-475.

"9.1.2.4 Power Control—9.1.2.4.2 Power Control Based Upon Neighbor Cell Load", 3GPP TR 25.814 V7.0.0, Jun. 2006, p. 86.

"Joint Proposal for 3GPP2 Physical Layer for FDD Spectra", Jul. 31, 2006, Montreal, QC, Canada, cover page and pp. 63-72.

* cited by examiner

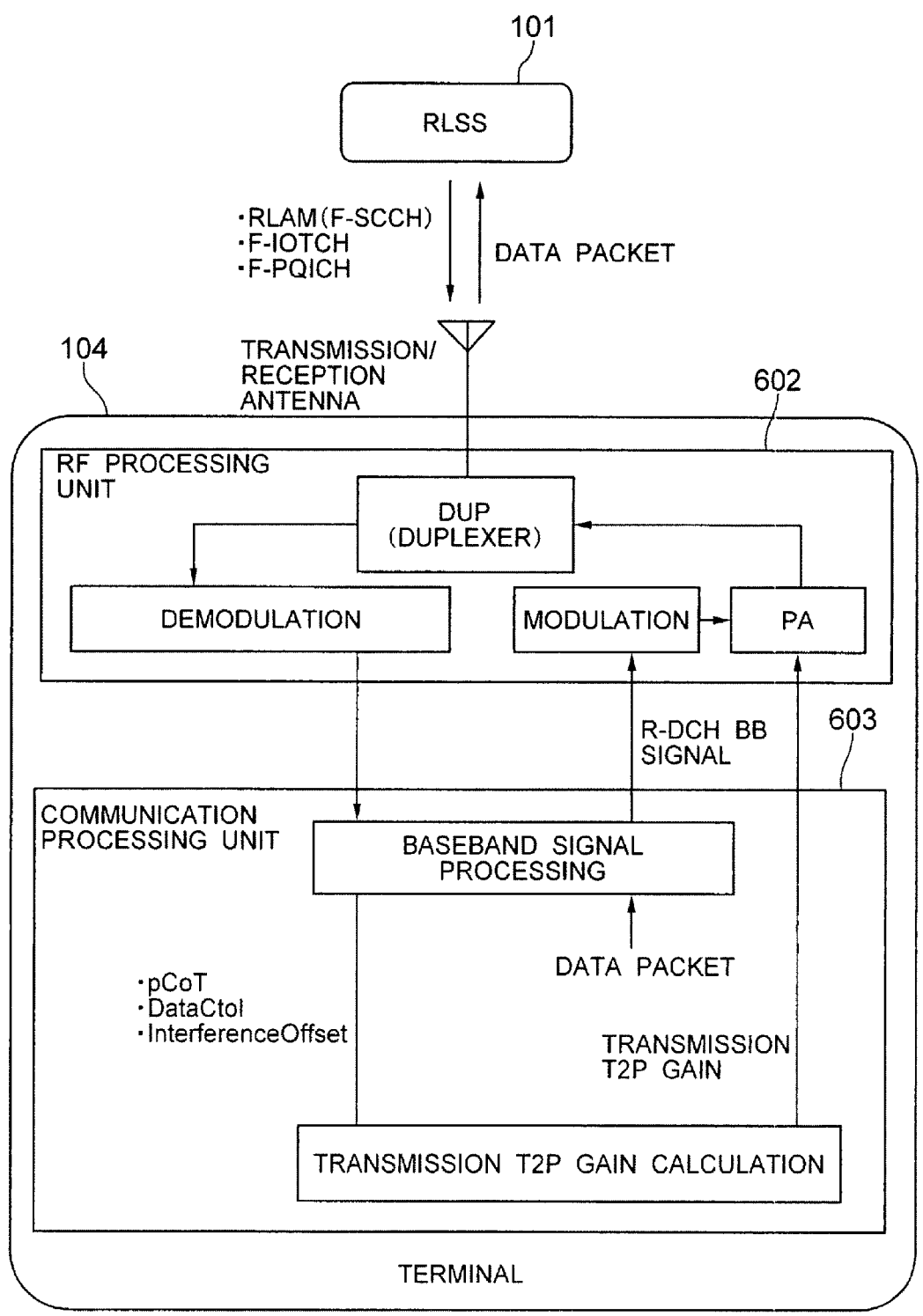

FIG. 14

| PARAMETER | | VALUE |
|---|---|---|
| THRESHOLD INTERFERENCE POWER FOR OSI=1 | | 3 dB |
| THRESHOLD INTERFERENCE POWER FOR OSI=2 | | 6 dB |
| UpDecisionThresholdMin | | $3 \times 2^{-7}$ |
| DnDecisionThresholdMin | | $7 \times 2^{-7}$ |
| RDCHGainMax | | 16 dB |
| RDCHGainMin | | 0 dB |
| ChanDiffMax | | 100 dB |
| ChanDiffMin | | 0 dB |
| UpDecisionVaLue | | 1 |
| DnDecisionVaLue | | 1 |
| No. OF OSIMonitorSets | | 2 |
| No. OF SECTORS | | 57 |
| No. OF TERMINALS PER SECTOR | | 2 |
| THERMAL NOISE DENSITY | | -174 dBm/Hz |
| UPSTREAM TARGET POWER | | -115 dBm |
| PACKET TRANSMISSION PROBABILITY OF TERMINAL | | 0.3 |
| METHOD OF NON-PATENT DOCUMENT 3GPP2 C30-20060731-040R4 | RDCHGainUp | 0.3 dB |
| | RDCHGainDn | 0.3 dB |
| | Dw FOR POWER INCREASE THRESHOLD | 0.25 |
| | Dw FOR POWER DECREASE THRESHOLD | -0.25 |
| METHOD OF PRESENT INVENTION | RDCHGainUp | 0.75 dB |
| | RDCHGainDn | 1.125 dB |

WIRELESS COMMUNICATION SYSTEM AND TERMINAL

INCORPORATION BY REFERENCE

The present application claims priority from Japanese application JP 2007-044855 filed on Feb. 26, 2007, the content of which is hereby incorporated by reference into this application.

BACKGROUND OF THE INVENTION

The present invention relates to a wireless communication method that uses OFDM (Orthogonal Frequency Division Multiplex) for wireless communication, and more particularly to a method for implementing cellular communication.

The research and development of a wireless communication method using OFDM is under way to increase the speed and capacity of wireless communication. In OFDM, transmission data is generated in the frequency domain, converted to time domain signals via IFFT (Inverse Fast Fourier Transform), and transmitted as radio signals. On the receiving side, the time domain signals are converted back to the frequency domain signals via FFT (Fast Fourier Transform) to produce the original information.

During communication, the transmission power of terminals must be controlled on an upstream line, via which signals are transmitted from terminals to base stations, to control the interference power that affects base stations.

The standards-setting organization IEEE802.20 proposes an OFDM-based wireless communication method. IEEE C802.20-06/04 defines an upstream transmission power control method for the wireless communication method described above.

The standards-setting organization 3GPP proposes an OFDM-based wireless communication method as LTE (Long Term Evolution). 3GPP TR 25.814 V7.0.0 (2006-06) defines an upstream transmission power control method for the wireless communication method described above.

The standards-setting organization 3GPP2 proposes an OFDM-based wireless communication method as UMB (Ultra Mobile Broadband). 3GPP2 C30-20060731-040R4 defines an upstream transmission power control method for the wireless communication method described above.

According to the upstream transmission power control of a terminal defined by IEEE802.20 and UMB, a base station decides the transmission power and sends an instruction to a terminal so that a predetermined reception power is given to a channel (there are multiple types) provided for transmitting a specific control signal. On the other hand, for OFDM data channels for transmitting information not belonging to the specific control signal described above such as user data or voices, the terminal increases or decreases T2P (Traffic-to-Pilot) gain according to the index OSI (Other Sector Interference), which indicates the interference status of each sector, to adjust the transmission power of the OFDM signal. In the description above, a sector refers to the logical division unit of base stations via a beam, and a terminal communicates directly with a sector. A T2P gain, which refers to the magnitude of the OFDM data channel transmission power with respect to the pilot transmission power, is defined by the transmission power per OFDM sub-carrier, that is, the power spectrum density.

First, each sector measures the interference power and the thermal noise power and, based on the measured result, calculates IoT (Interference over Thermal). IoT refers to a ratio of the interference power, which is received by a sector from the terminals whose RLSS (Reverse Link Serving Sector) is not the sector itself, to the noise power. An RLSS refers to a sector to which a terminal is to transmit data via the upstream line.

Each sector determines the interference status (0, 1, or 2) based on the calculated IoT and notifies this status to a terminal as the OSI. OSI=0 indicates low interference, OSI=1 indicates high interference, and OSI=2 indicates very high interference.

The OSI is notified from the sector to a terminal via F-OSICH (Forward OSI channel) or F-FOSICH (Forward Fast OSI Channel).

The terminal detects the OSI transmitted from the sectors defined by OSIMonitorSet and performs the operation according to a policy that the T2P gain is increased when the OSI is 0 and is decreased when the OSI is 1 or 2. OSIMonitorSet refers to a set of neighboring sectors, except the RLSS, that is pre-defined by the terminal.

More specifically, when the OSI value is 0, the terminal calculates the probability at which the power is increased and, based on the probability, decides whether the power is increased or not changed. When the OSI value is 1, the terminal calculates the probability at which the power is decreased and, based on the probability, decides whether the power is decreased or not changed. The probability at which the power is increased or decreased is calculated based on the current transmission power of the terminal and the magnitude of contribution to the interference in the base station. When the OSI is 2, the terminal always decides that the power be lowered. Whether the power is increased, decreased, or not changed corresponds, respectively, to three decision values.

After calculating the decision value described above for each sector belonging to OSIMonitorSet, the terminal calculates the average by weighting the decision values with propagation attenuations from each sector to the terminal so that the contribution of a nearer sector becomes larger.

Let the calculated value be Dw. If Dw is equal to or smaller than a threshold, the terminal decreases the T2P gain by a predetermined value. If Dw is equal to or larger than another threshold, the terminal increases the T2P gain by a predetermined value. If Dw does not satisfy either condition, the terminal does not change the T2P gain. The operation described above controls the transmission power of a terminal so that the transmission power per sub-carrier of a terminal near the center of a cell is increased and the transmission power per sub-carrier of a terminal distant from the center of a cell is decreased.

SUMMARY OF THE INVENTION

A first problem with the typical upstream power control method for an OFDM-based wireless communication method is that a desired operation is not always performed because the power increase/decrease policy is determined to one of the three (that is, power is increased, power is decreased, and power is not changed) based on the probability.

For example, assume that three sectors are included in OSIMonitorSet of a terminal and that OSI=1 for two sectors and OSI=0 for one sector. In this case, there is a possibility that the terminal interferes with two sectors and so it is desirable to decrease the power.

However, if the probability is used, there is a possibility that the terminal ignores the requests from base stations to decrease the power for the two sectors where the interference status is judged as OSI=1 and decides not to change the power and that the terminal decides to increase the power for the sector where the interference status is judged as OSI=0.

If the weighted average exceeds the threshold, the terminal increases the power though it is actually desirable to decrease the power.

When there are many terminals per sector, the interference of the whole sector is suppressed because the statistical effect becomes larger even though a few terminals perform the operation described above.

However, when there are few terminals per sector, the operation described above makes the interference situation worse because the statistical effect is smaller.

A second problem with the typical upstream power control method for an OFDM-based wireless communication method is that the power variation becomes large. For example, even if the interference power of a sector included in OSIMonitorSet of a terminal is near the threshold of OSI=0 and OSI=1, there is a possibility that the terminal increases the T2P gain by a predetermined value if OSI=0.

If the terminal increases the transmission power in this situation, interference much larger than the threshold is generated and this interference creates a need for lowering the transmission power again and, as a result, the transmission power varies greatly.

To achieve the object described above, a wireless communication system according to the present invention comprises a plurality of base stations and a plurality of terminals wherein each of the base stations comprises means that notifies the terminals of an intensity of a received interference power, each of the terminals comprises means that controls a transmission power for transmitting data to a base station, which is one of the plurality of base stations and to which data is to be transmitted, by referencing an intensity of interference power (OSI) notified from base stations to which data is not to be transmitted, and the means that controls a transmission power calculates a decision value for increasing/decreasing the transmission power, the decision value being variable according to a current transmission power of the terminal and propagation attenuations between the terminal and the base stations to which data is not to be transmitted, and variably controls the amount of transmission power increase/decrease according to the decision value for increasing/decreasing a transmission power.

The terminal further comprises means that measures the propagation attenuations between the terminal and the base stations to which data is not to be transmitted; and means that outputs the decision value specifying an increase in the power that is variable according to the current transmission power and the propagation attenuations when the intensity of the interference power is low and that outputs the decision value specifying a decrease in the power that is variable according to the current transmission power and the propagation attenuations when the intensity of the interference power is high.

The terminal further comprises means that outputs a power increase/decrease amount that is variable according to the decision value for increasing/decreasing a transmission power and that is decided in one transmission power adjustment.

As a decision value (Decision_i) for increasing/decreasing the power for sector i, the terminal further comprises means that outputs the decision value Decision_i as a product of a predetermined value UpDecisionValue and a power increase/decrease probability DecisionThreshold_i when the intensity of the interference power is low and outputs the decision value Decision_i as a product of a predetermined value −Dn-DecisionValue and the power increase/decrease probability DecisionThreshold_i when the intensity of the interference power is high.

The terminal calculates the decision values Decision_i for sectors that belong to the base stations to which data is not to be transmitted, calculates an average value Dw by weighting the plurality of decision values Decision_i with respective propagation attenuations, and increases the transmission power when Dw is a positive value and decreases the transmission power when Dw is a negative value.

The terminal uses a value calculated as a product of a predetermined value RDCHGainUp and Dw as a transmission power increase amount when the value Dw is a positive value and uses a value calculated as a product of a predetermined value RDCHGainDn and Dw as a transmission power decrease amount when the value Dw is a negative value.

A terminal according to the present invention calculates a decision value for increasing/decreasing a transmission power for transmitting data to a base station, to which data is to be transmitted, by referencing an intensity of an interference power (OSI) notified from base stations to which data is not to be transmitted, said decision value being variable according to a current transmission power and propagation attenuations between the terminal and the base stations to which data is not to be transmitted, and variably controls the amount of transmission power increase/decrease according to the decision value for increasing/decreasing a transmission power.

The system and the terminal of the present invention do not ignore a request from a sector but take into consideration the OSIs of, and an effect on interference with, all neighboring sectors in deciding a power increase/decrease and, therefore, solve the problem that the interference condition is deteriorated by the power control.

In addition, the system and the terminal of the present invention can vary the power increase/decrease amount according to the current transmission power and an effect on the interference with the neighboring sectors. Therefore, when the terminal transmission power is converged and the interference intensity of the neighboring sectors is near the allowable limit, the variation in the terminal transmission power can be suppressed.

In addition, the two effects described above improve the followability of the terminal transmission power with respect to the OSIs.

Other objects, features and advantages of the invention will become apparent from the following description of the embodiments of the invention taken in conjunction with the accompanying drawings.

BRIEF DESCRIPTION OF THE DRAWINGS

FIG. 13 is a block diagram showing the flow of signals in the terminal device in the second embodiment when a transmission T2P gain is decided.

FIG. 14 is a table showing simulation conditions.

DETAILED DESCRIPTION OF THE INVENTION

First Embodiment

A first embodiment of the present invention will be described below with reference to FIG. 1 to FIG. 9.

Figure 1:
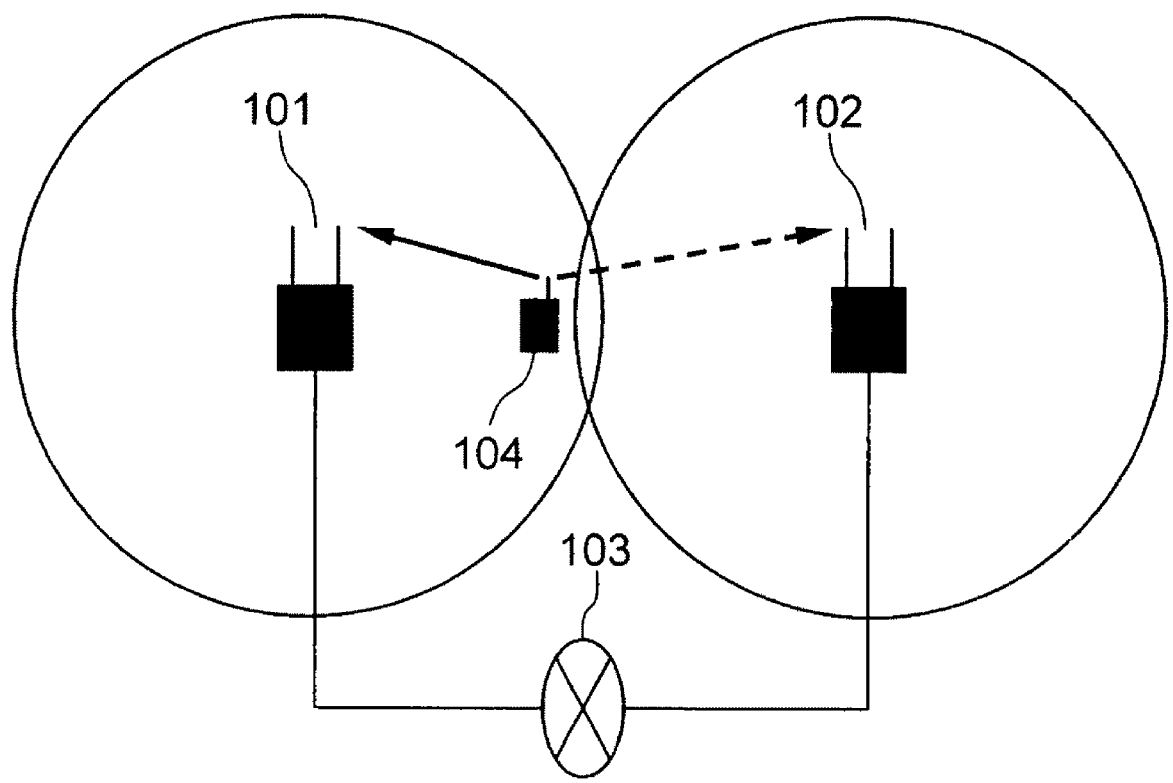
FIG. 1 is a diagram showing the configuration of an OFDM cellular system.

In general, an OFDM cellular wireless communication system comprises multiple base station devices and multiple terminal devices as shown in FIG. 1. Base station devices 101 and 102 are connected to a network 103 via a wired line. A terminal device 104 is connected wirelessly to the base station device 101 for communication with the network 103.

Each sector in an OFDM cellular base station receives signals from a terminal that is communicating with the sector itself, interference signals from terminals that are communicating with other sectors, and thermal noises.

The base station device of each sector measures the interference power and the thermal noise power and calculates the ratio between those powers as the IoT of the sector.

Based on the calculated IoT, each sector judges the intensity of received interference at one of three levels of OSI, that is, 0, 1, and 2. OSI=0, which indicates that the interference power is low, is a numeric value notifying the interference-source terminal of the sector that the transmission T2P gain can be increased.

OSI=1 and OSI=2, which indicate that the interference power is high, are numeric values requesting the interference-source terminal of the sector that the transmission T2P gain be decreased.

Especially, OSI=2, which indicates that the interference is very high, is a numeric value forcing the interference-source terminal of the sector to decrease the transmission T2P gain. Each sector transmits the OSI to a terminal via F-OSICH.

Figure 2:
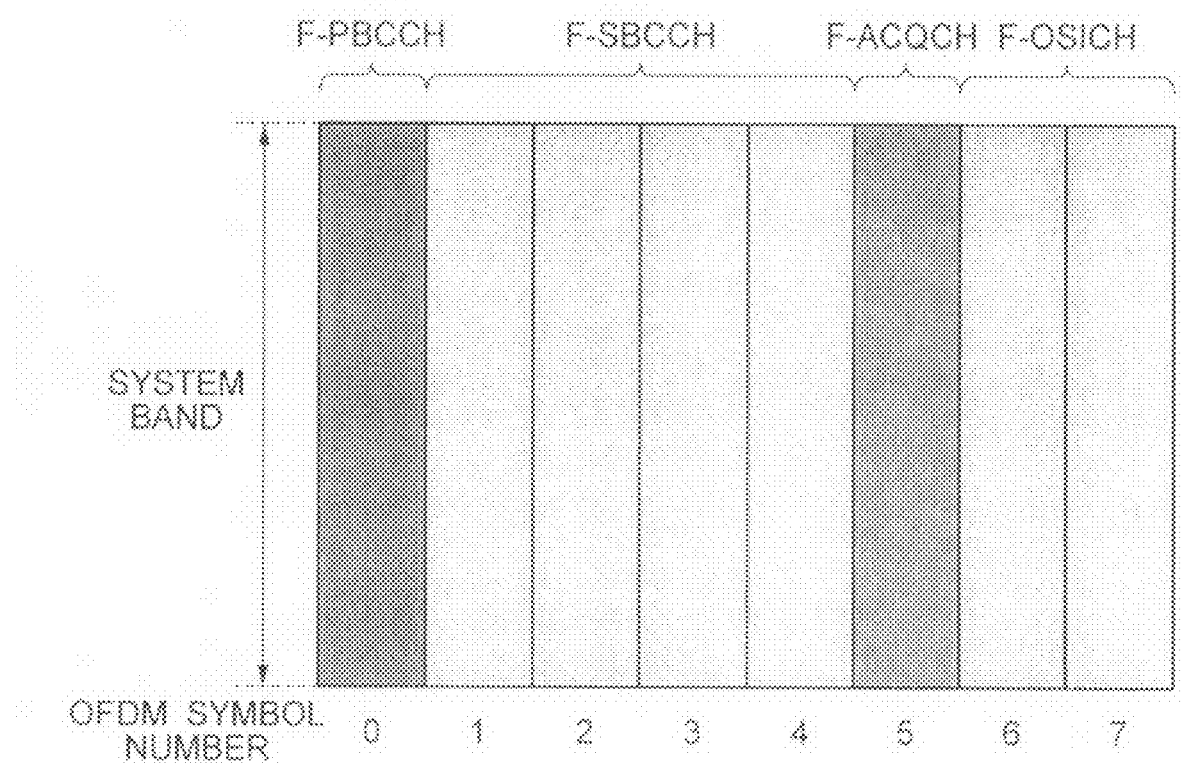
FIG. 2 is a diagram showing the format of a preamble.

F-OSICH is included in a preamble. The preamble is a signal sent regularly from a base station to allow a terminal to detect the base station. More specifically, the sixth and seventh OFDM symbols of the preamble are used as F-OSICH as shown in FIG. 2, and the value of the OSI corresponds to the modulation phase.

A terminal receives OSIs from multiple sectors via F-OSICH. However, the contribution of the transmission signal of a terminal to the interference power becomes lower as a sector is more distant from the terminal because the propagation attenuation in the wireless interval increases.

So, the terminal predefines a group of neighboring sectors, whose propagation attenuation is lower than a predetermined threshold, as OSIMonitorSet and monitors only the OSIs from the sectors belonging to OSIMonitorSet.

In FIG. 1, the base station device 101 is the RLSS of the terminal device 104. And, the base station device 102 is assumed to be one of sectors belonging to OSIMonitorSet of the terminal device 104.

Figure 5:
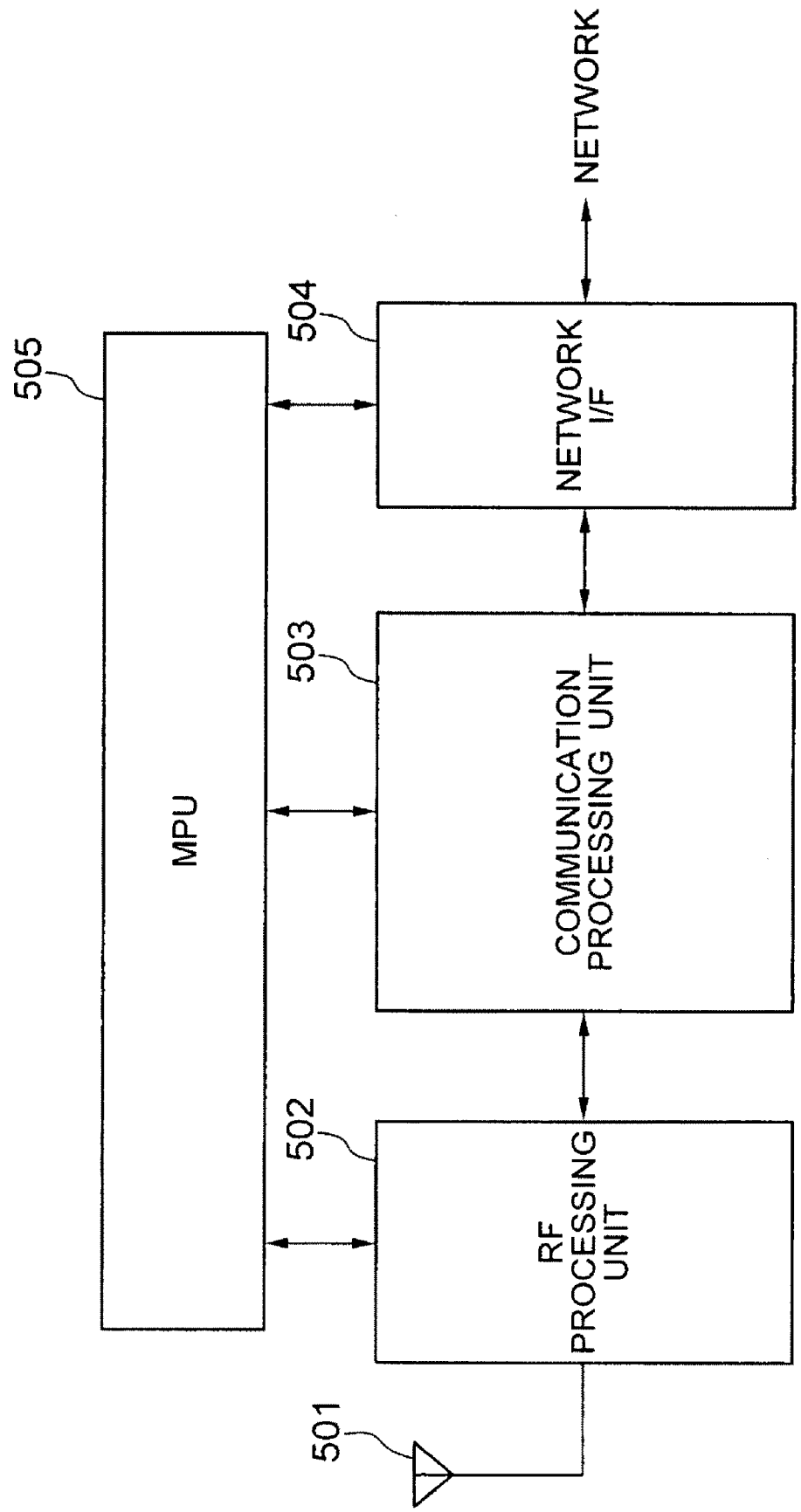
FIG. 5 is a block diagram of a base station device.

FIG. 5 is a diagram showing the configuration of the base station devices 101 and 102 each of which comprises an antenna 501, an RF processing unit 502, a communication processing unit 503, a network interface 504, and an MPU 505.

Figure 6:
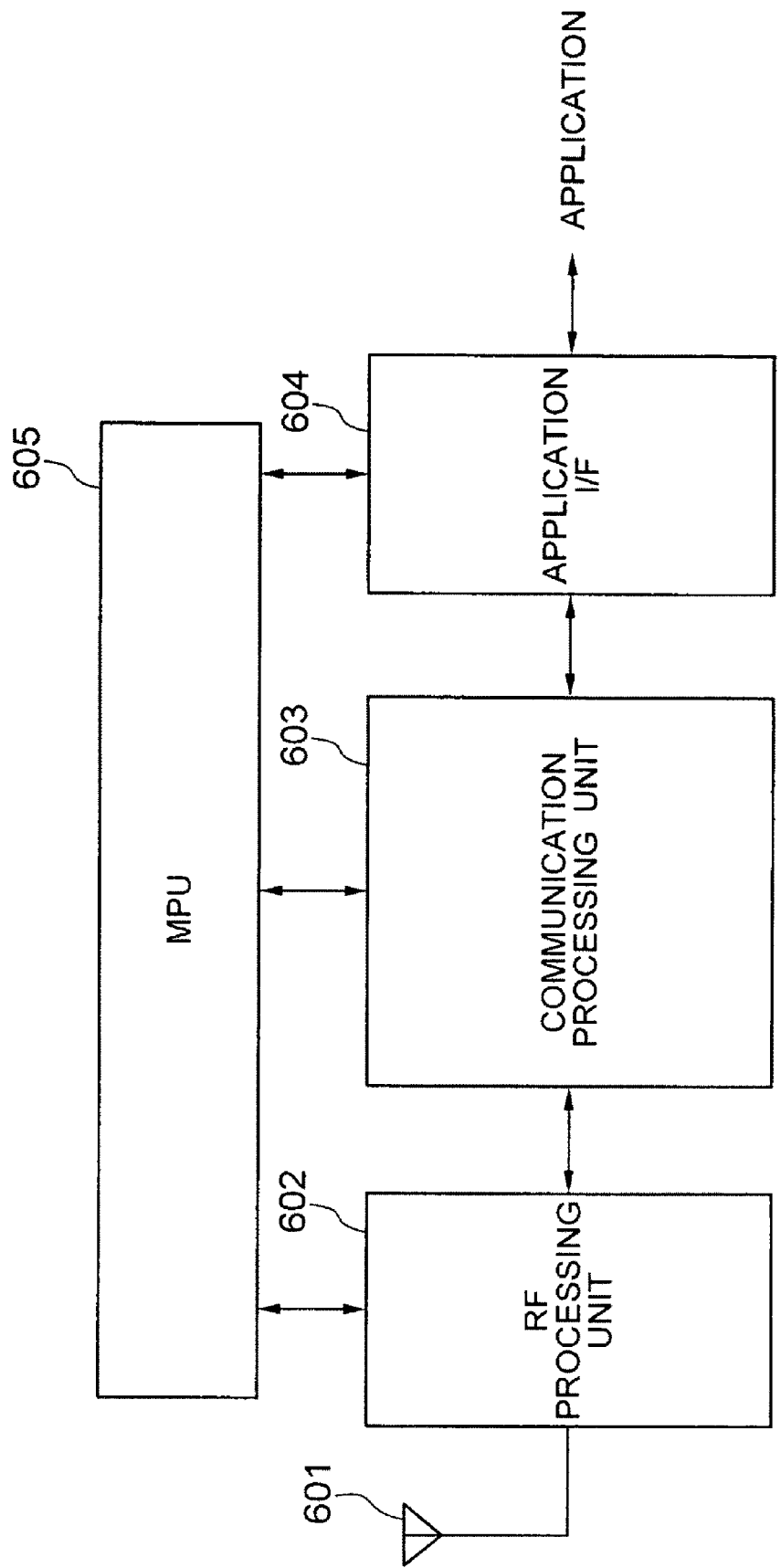
FIG. 6 is a block diagram of a terminal device.

FIG. 6 is a diagram showing the configuration of the terminal device 104 that comprises an antenna 601, an RF processing unit 602, a communication processing unit 603, an application interface 604, and an MPU 605.

Figure 7:
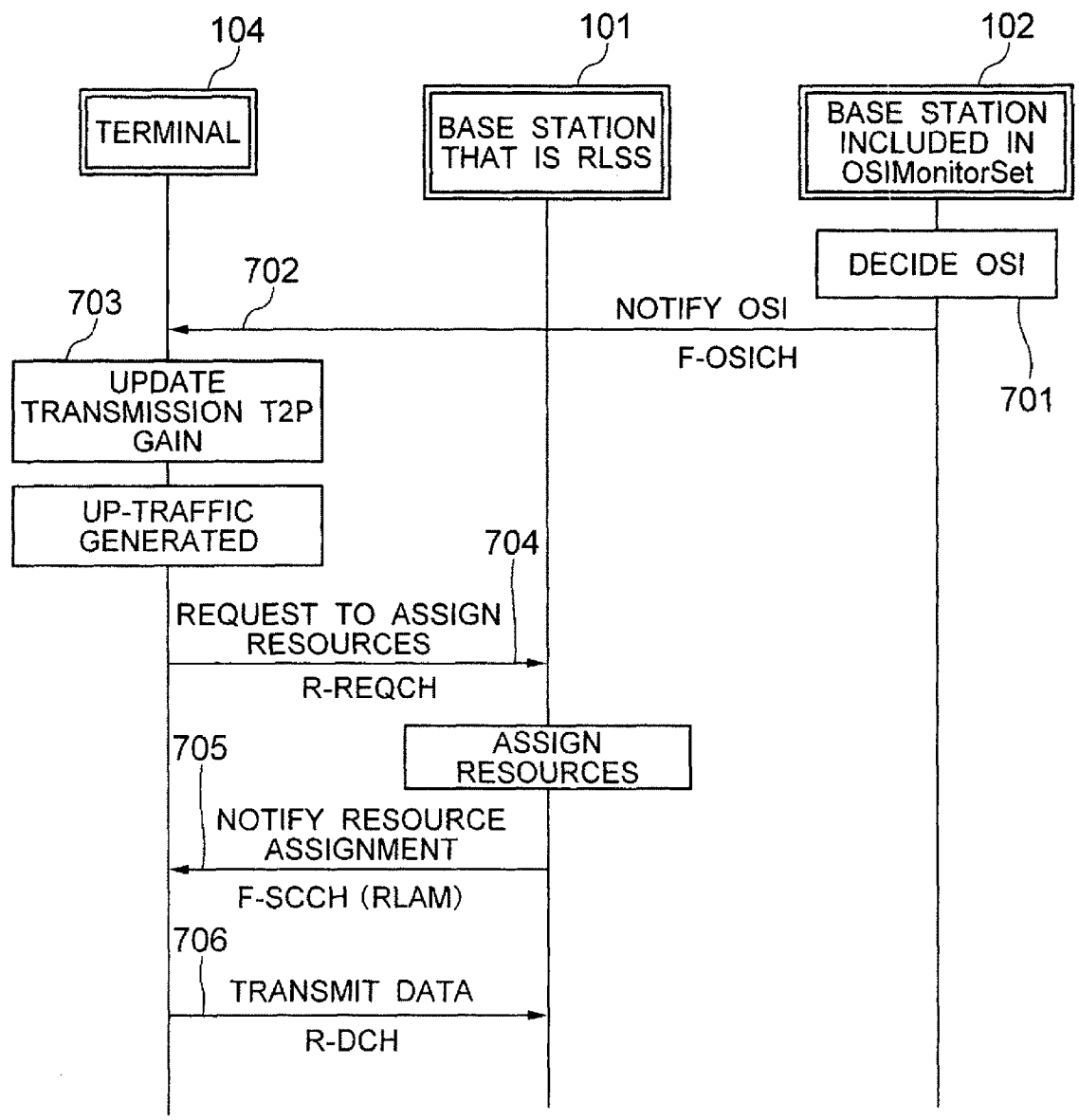
FIG. 7 is a sequence diagram showing a communication procedure between the devices in a first embodiment.

FIG. 7 is a sequence diagram showing the communication procedure in the first embodiment of the present invention.

The base station device 102 regularly determines the OSI (procedure 701) and notifies the terminal of the determined OSI via the preamble (procedure 702).

Figure 8:
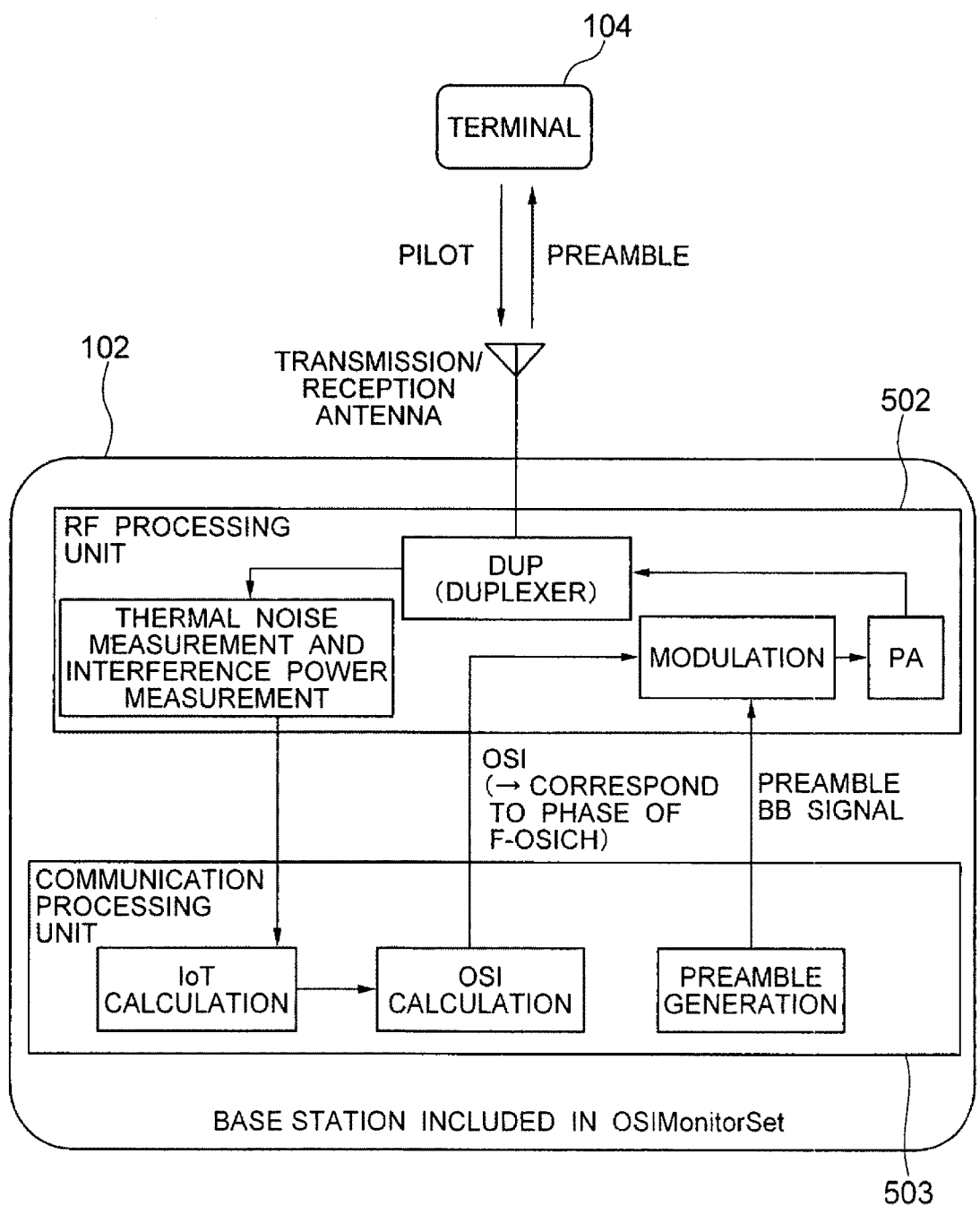
FIG. 8 is a block diagram showing the flow of signals in a base station device of a sector, which is not RLSS, in the first embodiment and a second embodiment.

The following describes procedure 701 more in detail with reference to FIG. 8. The base station device 102 uses the RF processing unit 502 to measure the thermal noise power and the interference power from the terminal.

A method for measuring the thermal noise power is proposed by 3GPP2 C30-20061030-073. In this method, the thermal noise power is measured in the period in which the transmission of the signal from the terminal to the base station is inhibited at an interval. Alternatively, instead of measuring the thermal noise by means of the RF processing unit 502 during the operation, it is also possible to save the value of the thermal noise, which is measured by a test in advance, in the memory and to reference the saved value during the operation.

Next, the communication processing unit 503 calculates the IoT from the measured thermal noise power and the interference power and evaluates the calculated value as one of levels, 0, 1, and 2, for use as the value of the OSI. The value of the OSI is converted to the phase of the sixth and seventh OFDM symbols of the preamble, and the phase is set in the modulation processing unit of the RF processing unit 502.

When the preamble is received from the RLSS and each sector included in OSIMonitorSet, the terminal device 104 updates the T2P gain of R-ODCH(Reverse OFDM Data Channel) that is the channel for transmitting upstream data (procedure 703).

Figure 9:
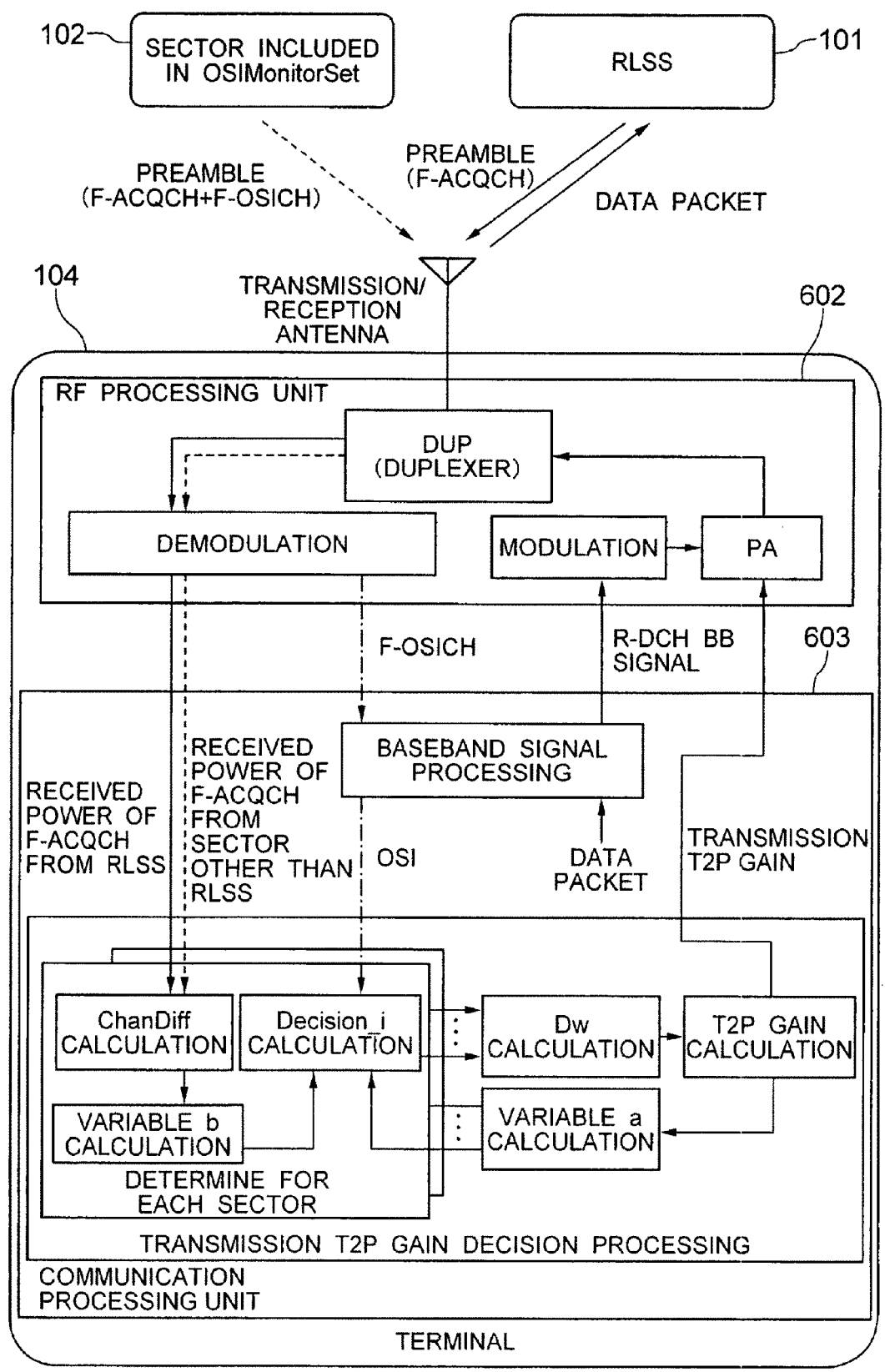
FIG. 9 is a block diagram showing the flow of signals in the terminal device in the first embodiment.

The following describes procedure 703 in detail with reference to FIG. 9. The terminal device 104 uses the RF processing unit 602 to measure the reception power of F-ACQCH (Forward Acquisition Channel) received from the RLSS and each sector included in OSIMonitorSet. F-ACQCH is included in the fifth OFDM symbol of the preamble shown in FIG. 2. On the other hand, the terminal device 104 uses the RF processing unit 602 and the communication processing unit 603 to acquire the OSI from the preamble received from each sector included in OSIMonitorSet.

The communication processing unit 603 uses the reception power of F-ACQCH and the OSI, acquired as described above, and the current transmission power to calculate the T2P gain. The calculated T2P gain is set in the power amplifier (PA) unit of the RF processing unit.

Figure 3:
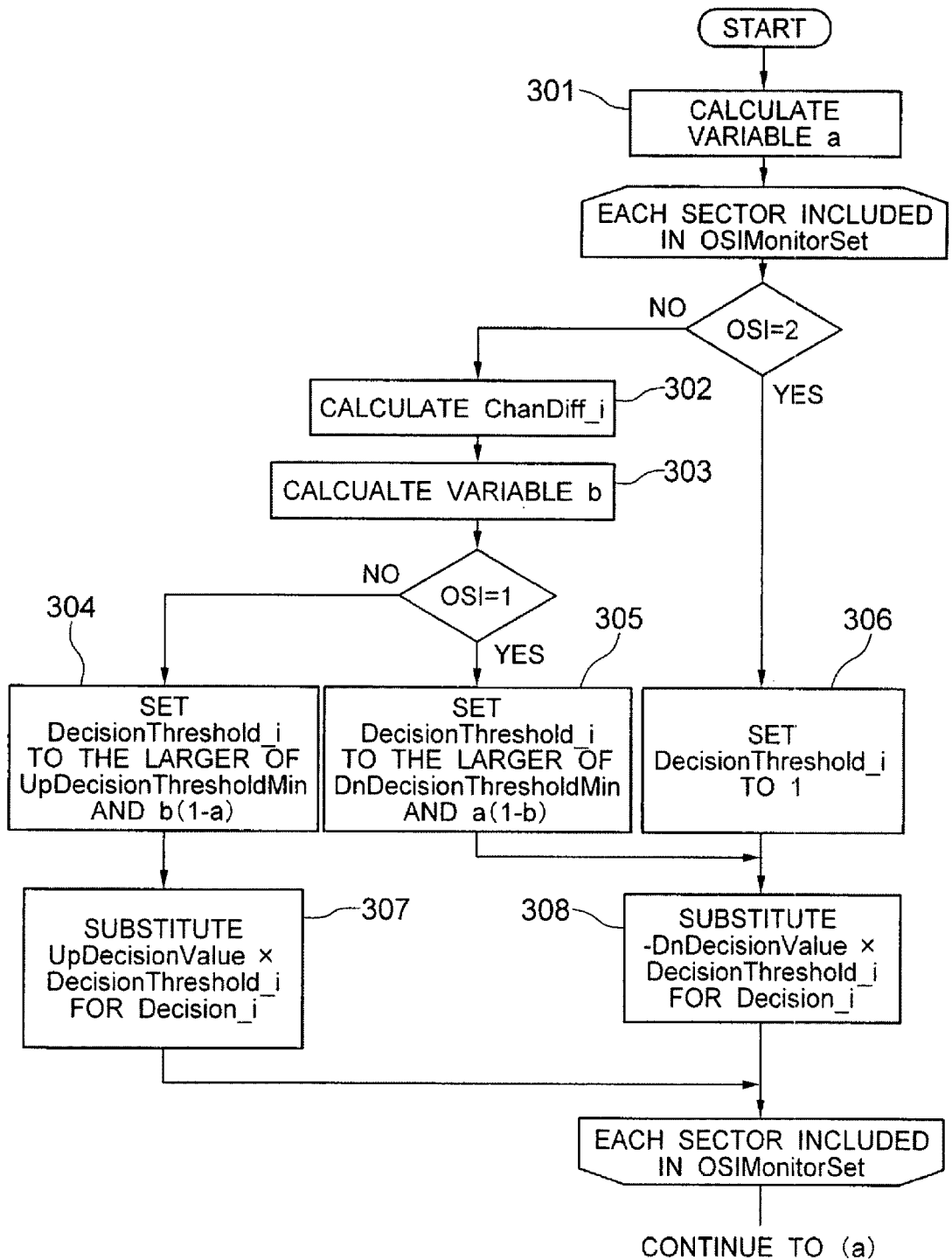
FIG. 3 is a flowchart showing the first half of T2P gain decision processing performed by a terminal of the present invention.
Figure 4:
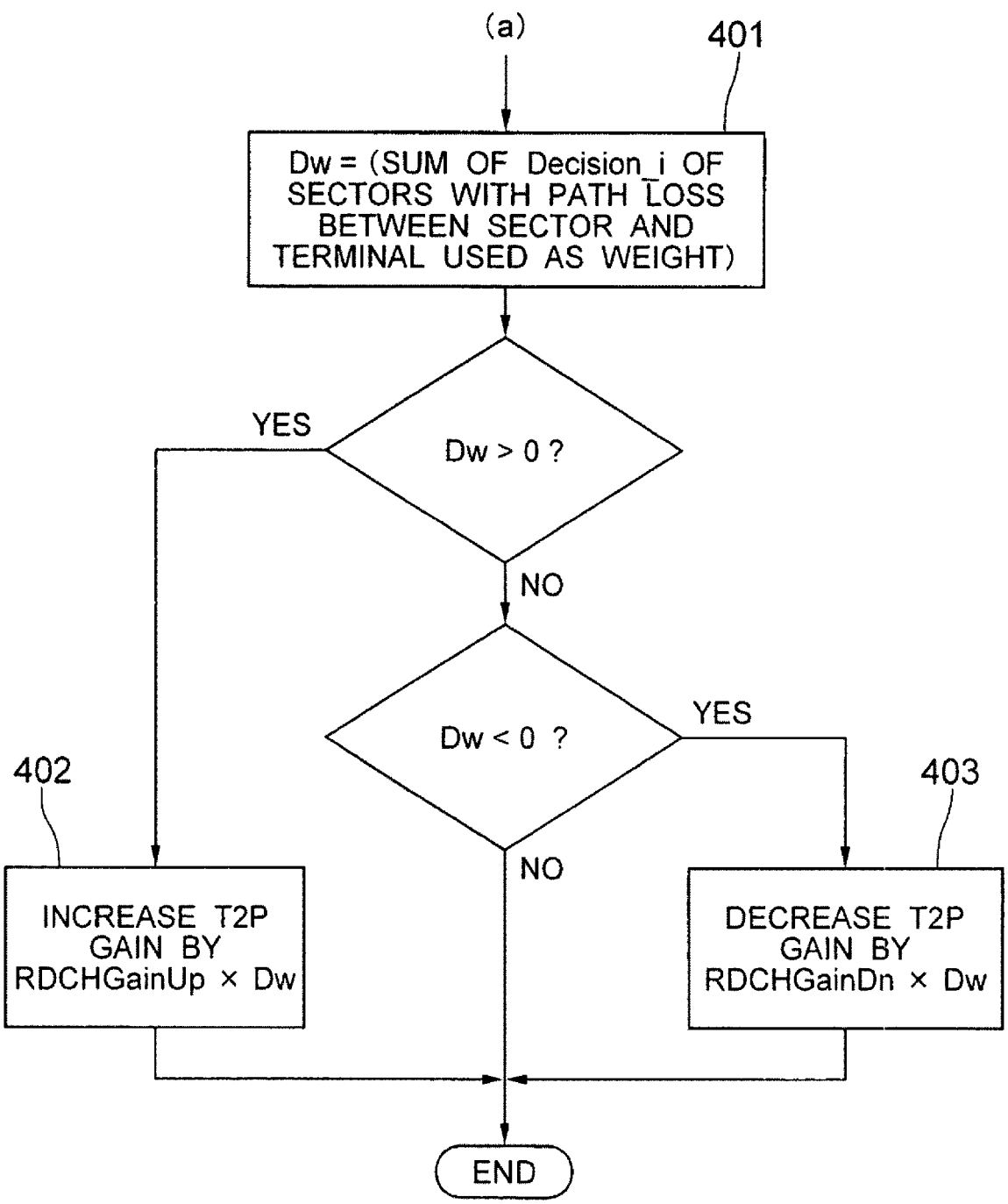
FIG. 4 is a flowchart showing the second half of T2P gain decision processing performed by the terminal of the present invention.

The following describes the calculation of a T2P gain with reference to FIG. 3 and FIG. 4. FIG. 3 and FIG. 4 are flowcharts showing how the terminal decides a T2P gain from a received OSI.

First, the terminal calculates the variable a from the current T2P gain RDCHGain using the following expression (procedure 301).

$$a = (\min(RDCHGain, RDCHGainMax) - RDCHGainMin) / (RDCHGainMax - RDCHGainMin)$$

where, RDCHGainMax and RDCHGainMin are the maximum value and the minimum value of RDCHGain, respectively, and both values are predetermined. a, which is a value ranging from 0 to 1, becomes larger as RDCHGain becomes larger.

Next, the terminal detects the OSI of a sector (hereinafter called sector i) belonging to OSIMonitorSet and, if OSI=0 or OSI=1, calculates ChanDiff_i that is the ratio between the propagation attenuation of sector i and the propagation attenuation of RLSS (procedure 302).

The propagation attenuation is calculated as the ratio between the reception power of F-ACQCH received from the sector and the transmission power. The larger ChanDiff_i is, the larger the propagation attenuation of sector i is and the lower the effect of the terminal on sector i is.

Next, the terminal calculates the variable b from the calculated ChanDiff_i using the following expression (procedure 303).

$$b = (\min(ChanDiff\_i, ChanDiffMax) - ChanDiffMin) / (ChanDiffMax - ChanDiffMin))$$

where ChanDiffMax and ChanDiffMin are the maximum value and the minimum value of ChanDiff_i, respectively, and both values are predetermined. b, which is a value ranging from 0 to 1, becomes larger as ChanDiff becomes larger. Note that, if OSI=2, the calculation of ChanDiff_i and b described above is not necessary.

Next, the terminal calculates DecisionThreshold_i that is the probability of power increase and decrease. If OSI=0, DecisionThreshold_i is calculated by the following expression (procedure 304).

$$DecisionThreshold\_i = \max(UpDecisionThresholdMin, (1-a)*b)$$

where, UpDecisionThresholdMin is the minimum value of DecisionThreshold_i when OSI=0, and this value is predetermined. DecisionThreshold_i, which is a value ranging from 0 to 1, has the property that it becomes smaller as the transmission power of the current terminal becomes larger and becomes smaller as the terminal gets near to a cell boundary.

If OSI=1, DecisionThreshold_i is calculated by the following expression (procedure 305).

$$DecisionThreshold\_i = \max(DnDecisionThresholdMin, a*(1-b))$$

where, DnDecisionThresholdMin is the minimum value of DecisionThreshold_i when OSI=1, and this value is predetermined. DecisionThreshold_i, which is a value ranging from 0 to 1, has the property that it becomes larger as the transmission power of the current terminal becomes larger and becomes larger as the terminal gets near to a cell boundary.

If OSI=2, DecisionThreshold_i=1 (procedure 306).

Next, the terminal calculates Decision_i that is the decision value of power increase/decrease for sector i. More specifically, if OSI=0, Decision_i is set to the product of UpDecisionValue and DecisionThreshold_i (procedure 307) and, if OSI=1 or OSI=2, Decision_i is set to the product of −DnDecisionValue and DecisionThreshold_i (procedure 308).

In those procedures, UpDecisionValue and DnDecisionValue are predetermined values requesting that the T2P gain be increased and decreased, respectively. Each of those values is multiplied by DecisionThreshold_i to represent the intensity of the request for increasing or decreasing the power for sector i where the intensity reflects the transmission power of the current terminal and its effect on the neighboring sectors.

After calculating Decision_i for all sectors belonging to OSIMonitorSet, the terminal calculates the average by weighting the Decision_i values with the ChanDiff_i values (procedure 401).

With this value as Dw, the terminal calculates the increase/decrease amount of the T2P gain according to the value of DW. If Dw is positive, the terminal increases the T2P gain by the amount calculated by the product of RDCHGainUp and Dw (procedure 402). If Dw is negative, the terminal decreases the T2P gain by the amount calculated as the product of RDCHGainDn and Dw (procedure 403).

RDCHGainUp and RDCHGainDn are the T2P gain increase/decrease amount base values that are predetermined respectively. Multiplying this base value by Dw allows the power increase/decrease amount to be adjusted according to the intensity of the power increase/decrease request of all sectors belonging to OSIMonitorSet.

The terminal decides the transmission power of an OFDM sub-carrier based on the decided T2P gain and the pilot power of the CDMA signal used to transmit the control channel.

As described above, the present invention calculates the ease of power increase/decrease according to the intensity of interference power of a neighboring sector, sets a decision value proportional to the ease, and calculates the weighted average of the decision values. And, the amount of T2P gain increase/decrease becomes proportional to the weighted average of the decision values. Therefore, the present invention achieves the effect not attainable when the power increase/decrease decision is made by the probability, that is, it provides the effect that the power is increased when the transmission power can be increased as well as the effect that the power variation is suppressed when the transmission power of the terminal is converged to a specific level value.

When an upstream traffic that uses R-ODCH is generated, the terminal device 104 uses R-REQCH(Reverse Request Channel) to request the base station device 101 of RLSS to assign the frequency and time resources for the above traffic (procedure 704).

R-REQCH includes information such as the buffer size of the terminal transmission data. Because R-REQCH is a channel for transmitting a control signal, its transmission power is not decided by procedure 703 but a value decided separately by the base station.

The base station device 101, which receives R-REQCH from the terminal, decides the frequency and time resources to be assigned to the terminal device 104 and, based on this, creates a resource assignment information message RLAM (Reverse Link Assignment Message).

The RLAM, a message transmitted from the base station to the terminal to send the sub-carrier information and packet format information used by the terminal on the upstream line, is transmitted from the base station device 101 to the terminal device 104 using F-SCCH (Forward Shared Control Channel) (procedure 705).

The transmission power of the terminal device 104 is set according to the transmission T2P gain that is set by procedure 703, and an upstream traffic packet is transmitted to the base station device 101 using the resources notified by the RLAM (procedure 706).

The effect of the first embodiment is shown by the result of a simulation experiment. In this simulation, two types of upstream transmission power control methods, that is, the method described in 3GPP2 C30-20060731-040R4 and the method of the present invention, are applied under the condition shown in FIG. 14 to randomly transmit upstream traffic packets via R-ODCH.

Figure 15:
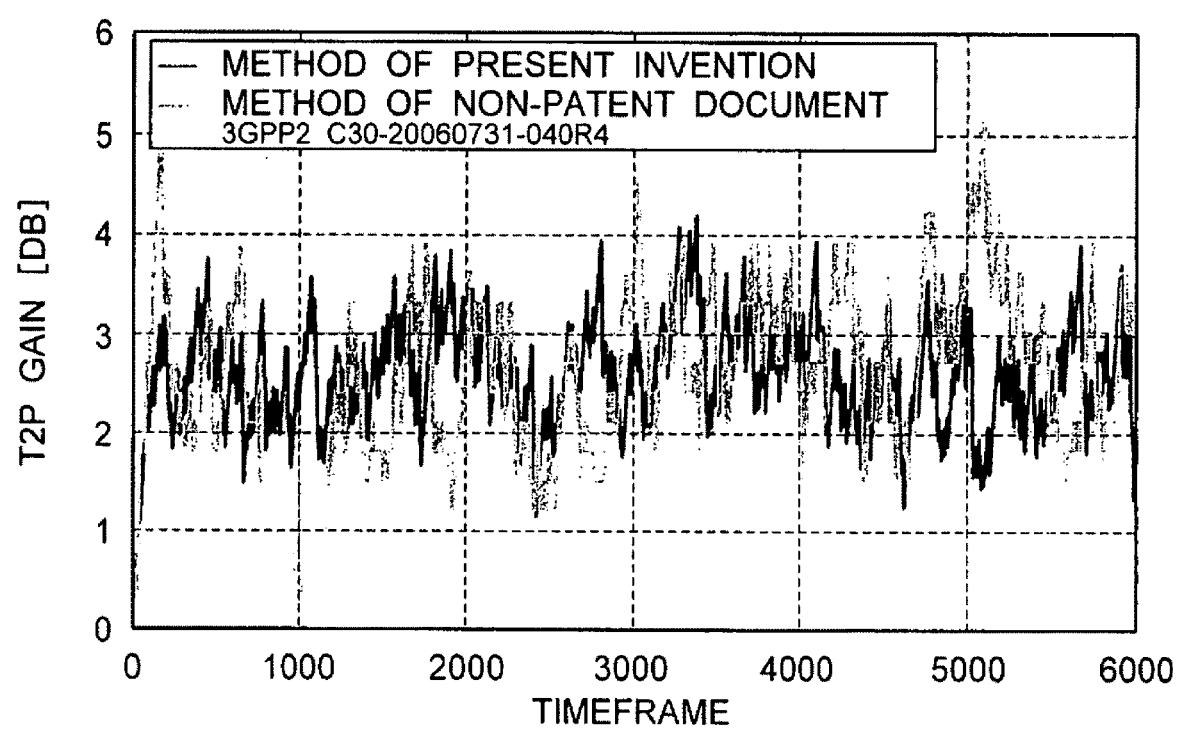
FIG. 15 is a graph showing variations in the T2P gain of a terminal.

FIG. 15 is a graph showing T2P gain variations on a terminal. This graph indicates that the method according to the present invention suppresses the variations in the transmission power more efficiently than the method described in 3GPP2 C30-20060731-040R4. The average transmission power to transmit frames from the 1000th frame to the 6000th frame is almost equal between those two methods, that is, 2.709 dB according to the method described in 3GPP2 C30-20060731-040R4 and is 2.648 dB according to the method of the present invention. In contrast, the variances of the same interval (true value) are different; that is, the variance is 0.12720 according to the method described in 3GPP2 C30-20060731-040R4 whereas it is a much smaller value of 0.0469 according to the method of the present invention. This also indicates that the method according to the present invention has the effect of suppressing the variations in the transmission power.

In the first embodiment of the present invention, the terminal calculates the ease of power increase/decrease for all sectors included in OSIMonitorSet and decides the transmission power as described above and, so, achieves the effect that upstream data can be transmitted at a power suitable for the interference status of the neighboring sectors.

Second Embodiment

A second embodiment of the present invention will be described with reference to FIG. 10 to FIG. 13.

The second embodiment is similar to the first embodiment in the device configuration of a base station device 101, a base station device 102, and a terminal device 104 but is different in the programs that run internally.

Figure 10:
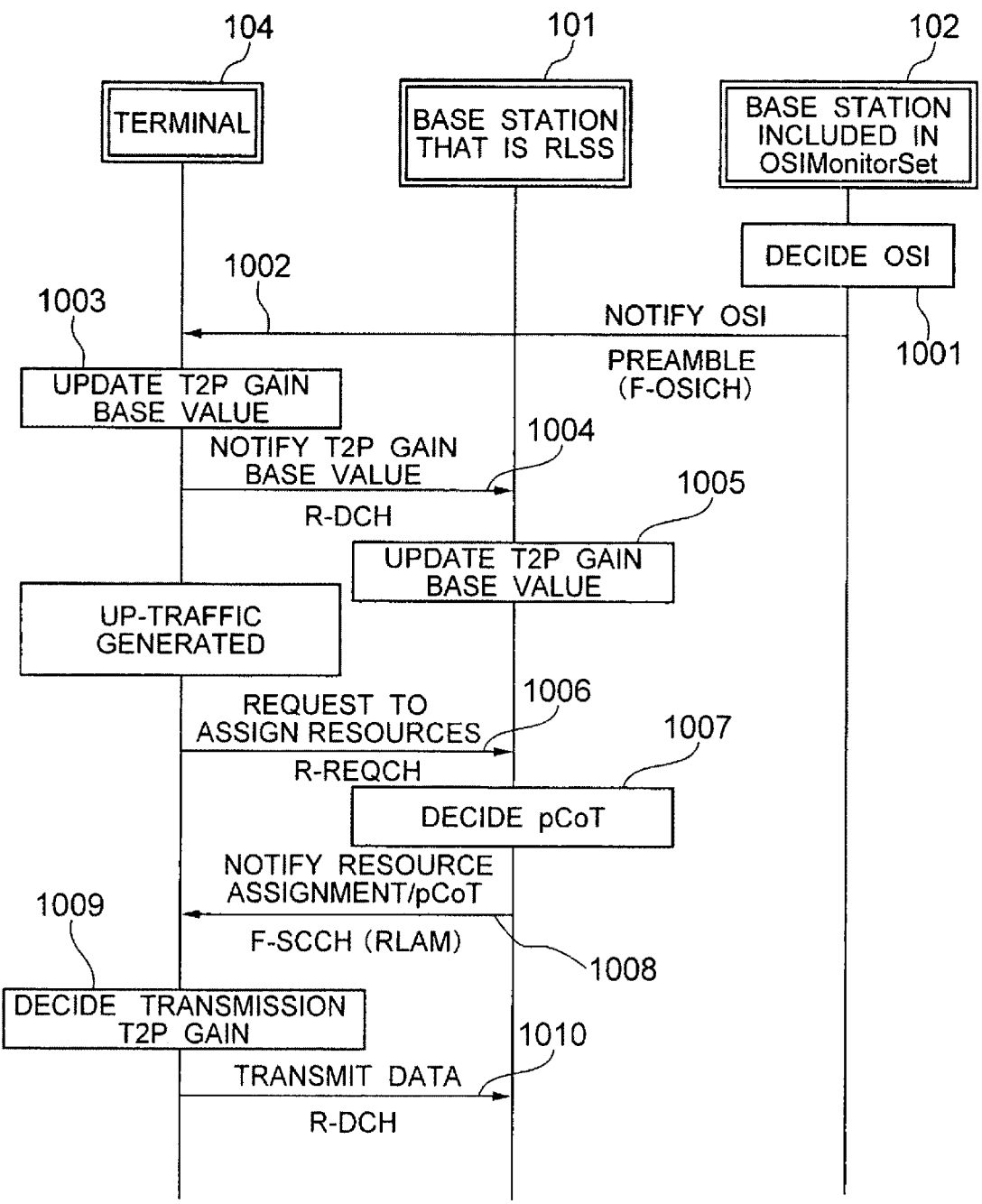
FIG. 10 is a sequence diagram showing a communication procedure between the devices in the second embodiment.

FIG. 10 is a sequence diagram showing the communication procedure in the second embodiment of the present invention.

The base station device 102 regularly decides an OSI (procedure 1001) and notifies the decided OSI to the terminal (procedure 1002) via the preamble. The detail of procedure 1001 is similar to that of procedure 701 in the first embodiment.

When the preamble is received from RLSS and each sector included in OSIMonitorSet, the terminal device 104 updates the T2P gain base value (procedure 1003) and sends it to the base station device 101 of RLSS via R-ODCH (Procedure 1004).

Figure 12:
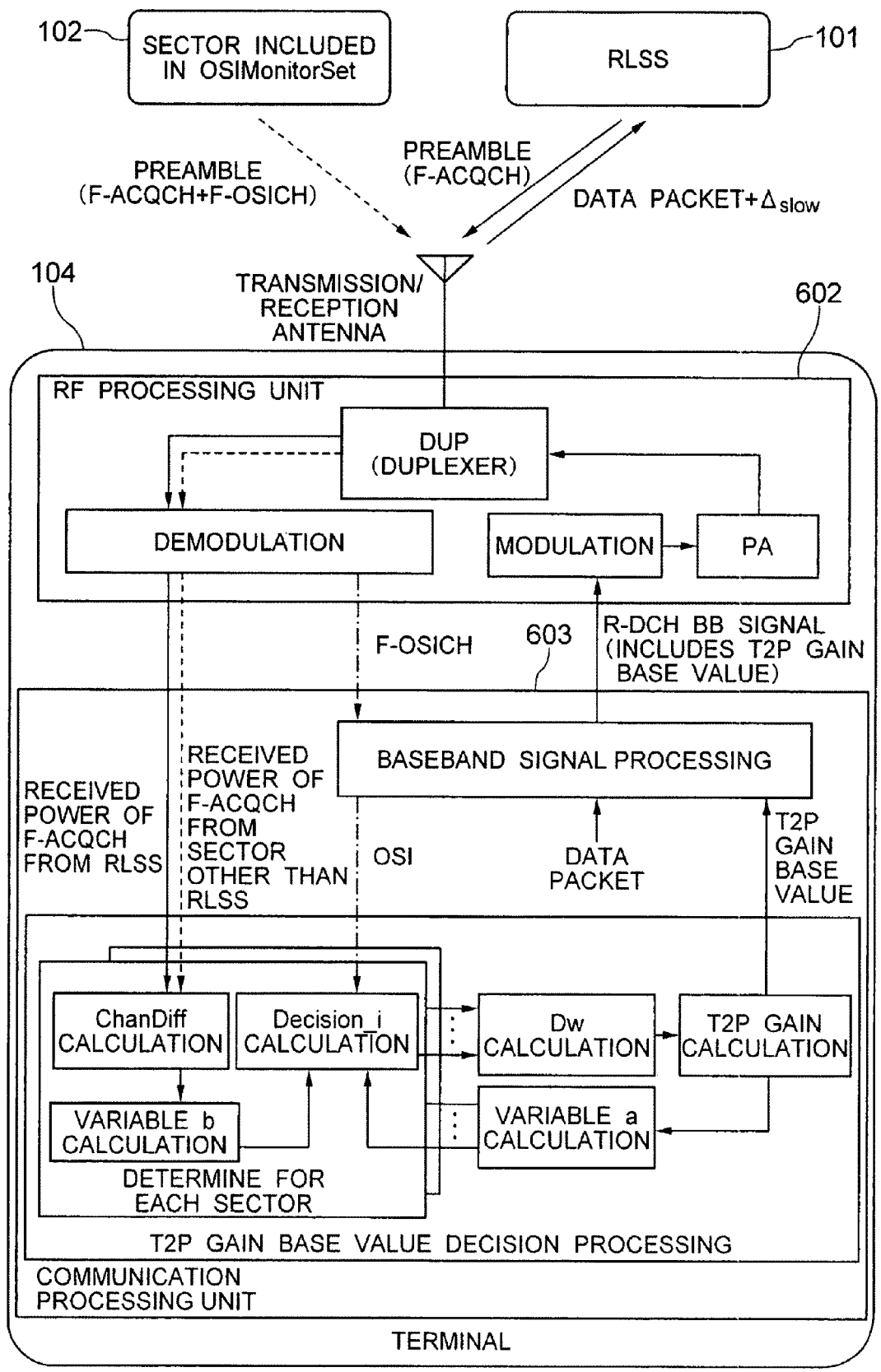
FIG. 12 is a block diagram showing the flow of signals in the terminal device in the second embodiment when a T2P gain base value is decided.

The following describes procedure 1003 more in detail with reference to FIG. 12. The terminal device 104 uses an RF processing unit 602 to measure the reception power of F-ACQCH received from RLSS and each sector included in OSIMonitorSet. On the other hand, the terminal device 104 uses the RF processing unit 602 and a communication processing unit 603 to acquire the OSI from the preamble received from each sector included in OSIMonitorSet.

The communication processing unit 603 uses the reception power of F-ACQCH acquired as described above, the OSI, and the current transmission power to calculate the T2P gain base value according to the procedure shown in FIG. 3 and FIG. 4. The acquired T2P gain base value is set in the MAC header of a data packet.

When the T2P gain base value is notified in procedure 1004, the base station device 101 updates the base value, held in the base station device 101, to the notified value (procedure 1005).

Figure 11:
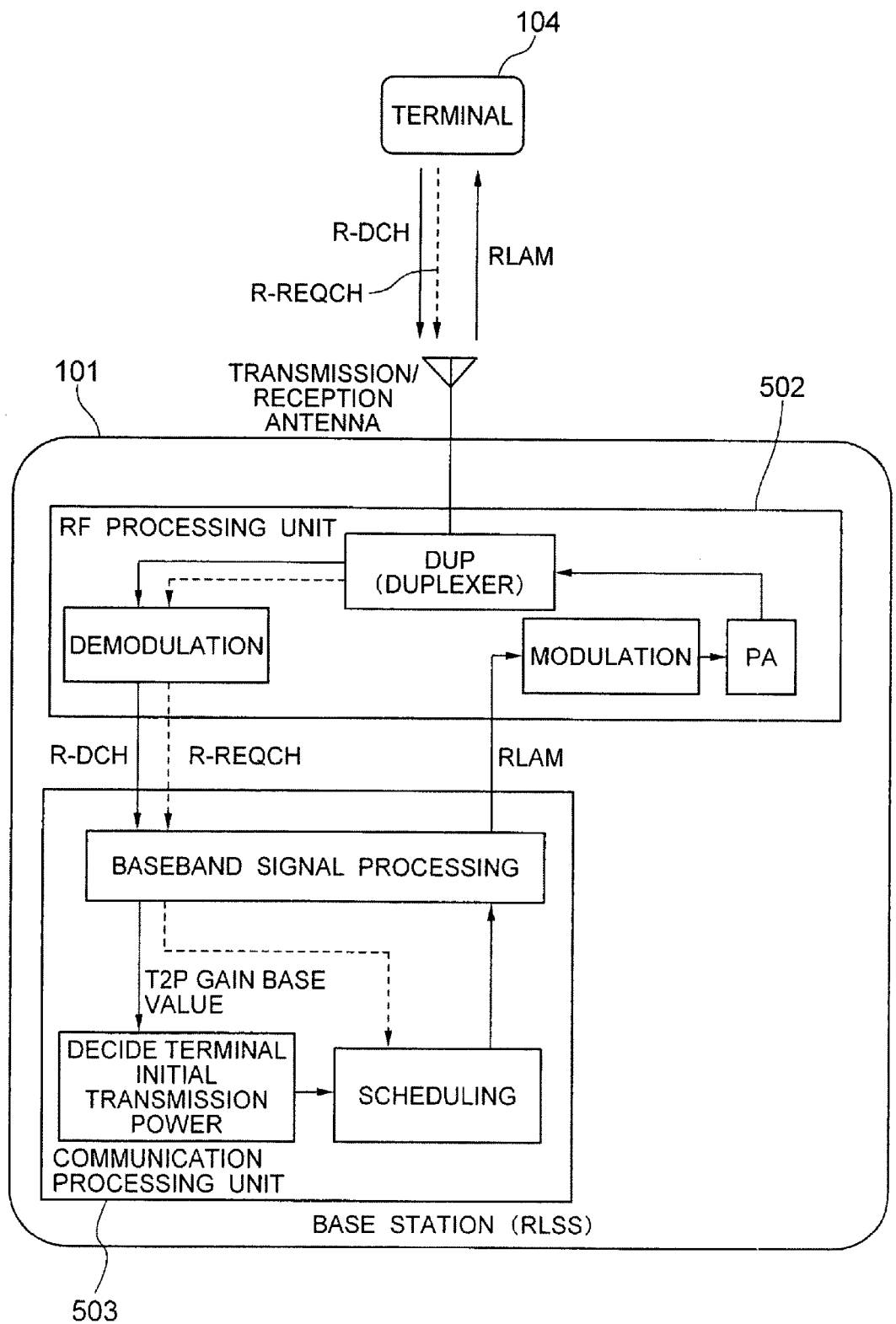
FIG. 11 is a block diagram showing the flow of signals in the base station device, which is RLSS, in the second embodiment.

The following describes procedure 1005 more in detail with reference to FIG. 11. After demodulating R-ODCH, received in procedure 1004, with the use of an RF processing unit 502, the base station device 101 uses a communication processing unit 503 to decode the data and acquires the T2P gain base value included in the MAC header. The acquired base value is stored in the memory of the communication processing unit 503.

When an upstream traffic that uses R-ODCH is generated, the terminal device 104 uses R-REQCH to request the base station device 101 of RLSS to assign frequency/time resources for the traffic described above (procedure 1006).

The base station device 101 decides the resource assignment and pCoT (pilot Carrier over Thermal information) that indicates the required CIR (procedure 1007) and notifies the terminal device 104 of the result via RLAM (procedure 1008).

The following describes procedure 1007 more in detail with reference to FIG. 11. After demodulating R-REQCH, received in procedure 1006, with the use of the RF processing unit 502, the base station device 101 uses the communication processing unit 503 to decode the data and retrieves the resource amount requested by the terminal.

Next, the base station device 101 assigns and schedules the resources and calculates pCoT using the retrieved resource request amount and the T2P gain base value held in procedure 1005.

When pCoT is notified from the base station in procedure 1008, the terminal device 104 sets the transmission T2P gain (procedure 1009) and sends the upstream traffic packet described above to the base station (procedure 1010).

The following describes procedure 1009 more in detail with reference to FIG. 13. After demodulating RLAM, F-IOTCH, and F-PQICH, received in procedure 1008, with the use of the RF processing unit 602, the terminal device 104 decodes the data and retrieves pCoT and other necessary parameters with the use of the communication processing unit 603.

Next, the communication processing unit 503 calculates the transmission T2P gain using the retrieved parameters and sets the resulting value in the PA of the RF processing unit 602.

As described above, the terminal calculates the ease of power increase/decrease for all sectors included in OSIMonitorSet and notifies the transmission power base value to the base station in the second embodiment. And, the base station decides the transmission power to be applied to the terminal and notifies the decided power to the terminal. The base station uses the transmission power base value, notified from the terminal, not only for deciding the terminal transmission power but also for deciding the transmission rate. Using the second embodiment achieves the effect that upstream data transmission, which is appropriate for the interference status of the neighboring sectors, can be used both for the transmission power and for the transmission rate.

The system and the terminal of the present invention optimize the transmission power control of an upstream line and prevent communication quality degradation especially in OFDMA-based cellular communication.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication system comprising a plurality of base stations and a plurality of terminals wherein
each of said base stations comprises means that notifies said terminals of an intensity of a received interference power,
each of said terminals comprises a power controller that controls a transmission power for transmitting data to a base station, which is one of said plurality of base stations and to which data is to be transmitted, by referencing an intensity of interference power (OSI: Other Sector Interference) notified from base stations to which data is not to be transmitted, the power controller calculates a decision value for increasing/decreasing the transmission power, said decision value being variable according to a current transmission power of the terminal and propagation attenuations between the terminal and the base stations to which data is not to be transmitted, the power controller controls the amount of transmission power increase/decrease according to the decision value for increasing/decreasing a transmission power, and each of said terminals further comprises:

means that measures the propagation attenuations between the terminal and the base stations to which data is not to be transmitted;

means that outputs the decision value specifying an increase in the power that is variable according to the current transmission power and the propagation attenuations when the intensity of the interference power is low and that outputs the decision value specifying a decrease in the power that is variable according to the current transmission power and the propagation attenuations when the intensity of the interference power is high; and means that outputs a power increase/decrease amount that is variable according to the decision value for increasing/decreasing a transmission power and that is decided in one transmission power adjustment.

2. The wireless communication system according to claim 1 wherein said wireless communication system is an OFDM (Orthogonal Frequency Division Multiplex) cellular wireless communication system.

3. The wireless communication system according to claim 1, wherein, as a decision value (Decision_i) for increasing/decreasing the power for sector i, said terminal further comprises means that outputs the decision value Decision_i as a product of a predetermined value UpDecisionValue and a power increase/decrease probability DecisionThreshold_i when the intensity of the interference power is low and outputs the decision value Decision_i as a product of a predetermined value −DnDecisionValue and the power increase/decrease probability DecisionThreshold_i when the intensity of the interference power is high.

4. The wireless communication system according to claim 3 wherein said terminal calculates the decision values Decision_i for sectors that belong to said base stations to which data is not to be transmitted, calculates an average value Dw by weighting said plurality of decision values Decision_i with respective propagation attenuations, and increases the transmission power when Dw is a positive value and decreases the transmission power when Dw is a negative value.

5. The wireless communication system according to claim 4 wherein said terminal uses a value calculated as a product of a predetermined value RDCHGainUp and Dw as a transmission power increase amount when the value Dw is a positive value and uses a value calculated as a product of a predetermined value RDCHGainDn and Dw as a transmission power decrease amount when the value Dw is a negative value.

6. A terminal that calculates a decision value for increasing/decreasing a transmission power for transmitting data to a base station, to which data is to be transmitted, by referencing an intensity of an interference power (OSI) notified from base stations to which data is not to be transmitted, said decision value being variable according to a current transmission power and propagation attenuations between the terminal and the base stations to which data is not to be transmitted, and controls the amount of transmission power increase/decrease according to the decision value for increasing/decreasing a transmission power, and wherein said terminal comprises:

means that measures the propagation attenuations between the terminal and the base stations to which data is not to be transmitted;

means that outputs the decision value specifying an increase in the power that is variable according to the current transmission power and the propagation attenuations when the intensity of the interference power is low and that outputs the decision value specifying a decrease in the power that is variable according to the current transmission power and the propagation attenuations when the intensity of the interference power is high; and means that outputs a power increase/decrease amount that is variable according to the decision value for increasing/decreasing a transmission power and that is decided in one transmission power adjustment.

7. The terminal according to claim 6 wherein said terminal performs OFDM cellular wireless communication.

8. The terminal according to claim 6 wherein, as a decision value (Decision_i) for increasing/decreasing the power for sector i, said terminal further comprises means that outputs the decision value Decision_i as a product of a predetermined value UpDecisionValue and a power increase/decrease probability DecisionThreshold_i when the intensity of the interference power is low and outputs the decision value Decision_i as a product of a predetermined value −DnDecisionValue and the power increase/decrease probability DecisionThreshold_i when the intensity of the interference power is high.

9. The terminal according to claim 8 wherein said terminal calculates the decision values Decision_i for sectors that belong to the base stations to which data is not to be transmitted, calculates an average value Dw by weighting said plurality of decision values Decision_i with respective propagation attenuations, and increases the transmission power when Dw is a positive value and decreases the transmission power when Dw is a negative value.

10. The terminal according to claim 9 wherein said terminal uses a value calculated as a product of a predetermined value RDCHGainUp and Dw as a transmission power increase amount when the value Dw is a positive value and uses a value calculated as a product of a predeterimined value RDCHGainDn and Dw as a transmission power decrease amount when the value Dw is a negative value.

* * * * *